United States Patent
Kuwahara et al.

(10) Patent No.: US 9,948,901 B2
(45) Date of Patent: Apr. 17, 2018

(54) MOVING INFORMATION ANALYZING SYSTEM, CAMERA, AND MOVING INFORMATION ANALYZING METHOD

(71) Applicant: Panasonic Intellectual Property Management Co., Ltd., Osaka (JP)

(72) Inventors: Marie Kuwahara, Fukuoka (JP); Junko Noda, Fukuoka (JP); Shinichi Tsukahara, Fukuoka (JP); Mitsuyoshi Yamamoto, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 176 days.

(21) Appl. No.: 14/754,078

(22) Filed: Jun. 29, 2015

(65) Prior Publication Data

US 2015/0379725 A1    Dec. 31, 2015

(30) Foreign Application Priority Data

Jun. 30, 2014   (JP) .................. 2014-135232

(51) Int. Cl.
*H04N 7/18* (2006.01)
*G06T 11/00* (2006.01)
(Continued)

(52) U.S. Cl.
CPC ............ *H04N 7/181* (2013.01); *G06T 11/00* (2013.01); *H04N 5/2226* (2013.01); *H04N 5/23206* (2013.01); *H04N 5/23229* (2013.01)

(58) Field of Classification Search
CPC ............................... H04N 7/181; H04N 7/183
(Continued)

(56) References Cited

U.S. PATENT DOCUMENTS

2007/0296814 A1*  12/2007  Cooper .................. G06T 7/254
                                                            348/143

2009/0134968 A1   5/2009  Girgensohn et al.
2010/0013931 A1   1/2010  Golan et al.

FOREIGN PATENT DOCUMENTS

JP    2003-101999 A    4/2003
JP    2009-134688      6/2009
(Continued)

OTHER PUBLICATIONS

MOBOTIX Security Vision Systems, "MxAnalytics Camera-Integrated Video Analysis With The MOBOTIX Q24", 6 pages.
(Continued)

*Primary Examiner* — Dominic D Saltarelli
(74) *Attorney, Agent, or Firm* — Seed IP Law Group LLP

(57) ABSTRACT

The present invention relates to a moving information analyzing system in which a camera and a server are connected to each other. The camera includes an imaging section that captures an image of a predetermined imaging region, a background image generating section that repeatedly generates a background image of a captured image of the imaging region at predetermined timings, a moving information analyzing section that extracts moving information regarding a staying position or a passing position in the imaging region of a moving object included in the captured image, and a transmitter that transmits the background image generated by the background image generating section and the moving information of the moving object extracted by the moving information analyzing section to the server at a predetermined transmission cycle. The server includes an image generating section that generates a moving information analysis image in which the moving information of the moving object is superimposed on the background image of the captured image, and a display control section that displays the moving information analysis image generated by the image generating section on a display unit.

10 Claims, 13 Drawing Sheets

(51) Int. Cl.
*H04N 5/222* (2006.01)
*H04N 5/232* (2006.01)

(58) Field of Classification Search
USPC .......................................................... 348/143
See application file for complete search history.

(56) References Cited

FOREIGN PATENT DOCUMENTS

| | | |
|---|---|---|
| JP | 2009-284167 A | 12/2009 |
| JP | 2010-272958 A | 12/2010 |
| JP | 2011-248513 A | 12/2011 |
| JP | 2014-60553 | 4/2014 |
| WO | 2007/022011 A2 | 2/2007 |

OTHER PUBLICATIONS

International Search Report and Written Opinion dated Sep. 29, 2015, for corresponding International Application No. PCT/JP2015/003209, 9 pages.
Extended European Search Report, dated Apr. 5, 2017, for corresponding European Application No. 15814021.0-1902 / 3163872, 9 pages.

* cited by examiner

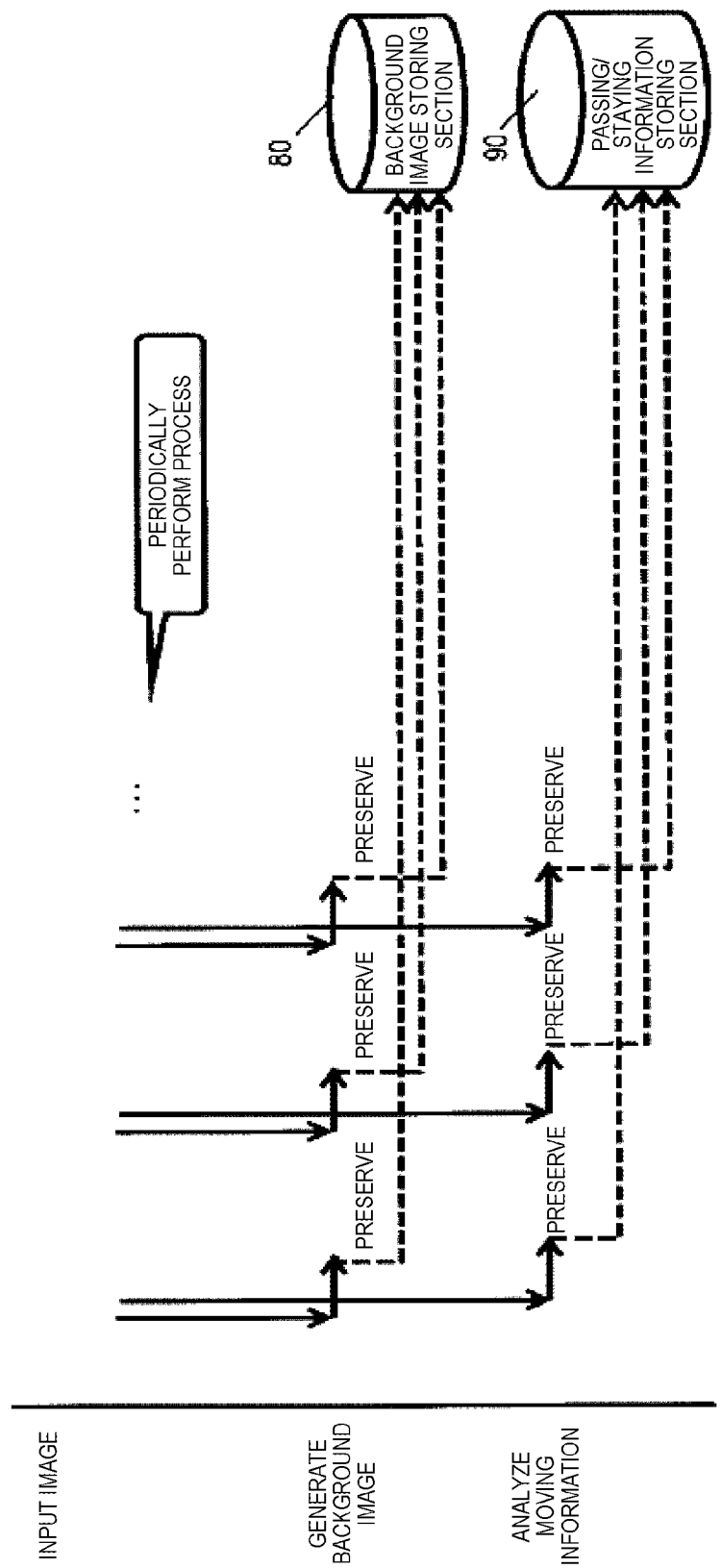

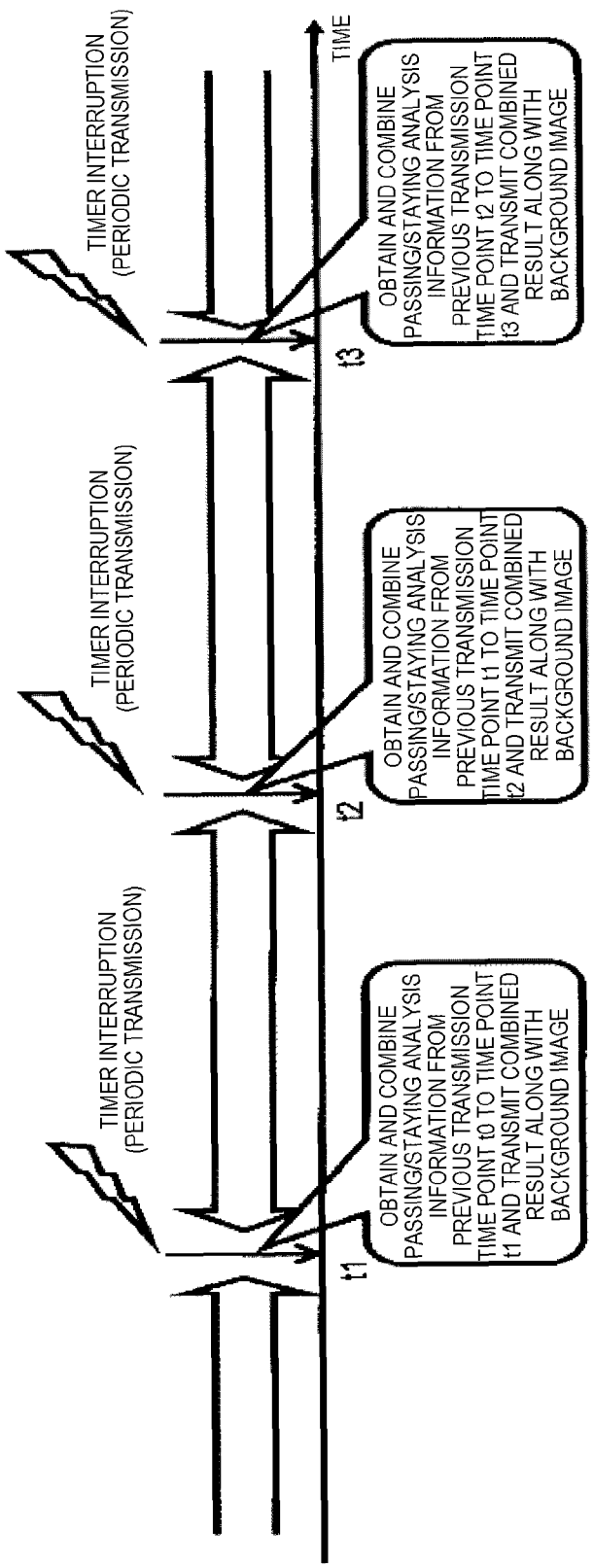

MOVING INFORMATION ANALYZING SYSTEM, CAMERA, AND MOVING INFORMATION ANALYZING METHOD

BACKGROUND OF THE INVENTION

1. Field of the Invention

The present invention relates to a moving information analyzing system, camera, and a moving information analyzing method capable of generating a moving information analysis image in which staying information or passing information of a person is superimposed on an image captured by the camera.

2. Description of the Related Art

As the related art in which a level of activity of a person over a period of time at an imaging site where a camera is provided is displayed as a heat map image, for example, Japanese Patent Unexamined Publication No. 2009-134688 is known.

Japanese Patent Unexamined Publication No. 2009-134688 discloses a technique of analyzing moving information of a person at the imaging site where a security camera connected to a network is provided so as to calculate a level of activity, generating a heat map image in which a detection result from a sensor is superimposed on a floor plan, and displaying the heat map image on a browser screen corresponding to the security camera. Consequently, it is possible to understand a level of activity of the person at the imaging site by viewing the heat map image displayed on the browser screen.

In addition, a technique has also been proposed in which a heat map image is generated by superimposing a moving information density of a person or a detection result of the number of people on an image captured by a camera unlike on the floor plan described in the above-described technique and is then displayed (for example, refer to the network camera system "MOBOTIX Q24" manufactured by MOBOTIX AG).

Here, in a case where a detection result from the sensor is superimposed on the floor plan in Japanese Patent Unexamined Publication No. 2009-134688, the floor plan is required to accurately match an image of the imaging site captured by the security camera, but since the floor plan is invariable in the technique, the image and the floor plan match each other only in a case where an arrangement of the imaging site is not changed from the time when the floor plan as a base of a heat map image is created.

Here, a case is assumed in which a camera captures an image of a predetermined region (for example, a predefined position in a store), and a layout regarding an arrangement of a merchandise display self or the like in the store is changed.

When a heat map image is generated by superimposing staying information or passing information of the person obtained after the store opens on an image such as a still image obtained before the store opens in order to protect privacy of the person, if a layout in the store is changed, the staying information or passing information of the person obtained before the layout is changed does not match an image captured by the camera after the layout is changed, and thus an accurate heat map image in which the staying information or the passing information is reflected cannot be obtained.

For this reason, when the layout in the store is changed, the floor plan related to the layout is required to be changed in Japanese Patent Unexamined Publication No. 2009-134688. In addition, in the network camera system, since an image as a base of the heat map image is the image captured by the camera, the person is shown in the image, and thus there is a problem in that privacy of the person is not appropriately protected.

SUMMARY OF THE INVENTION

In order to solve the above-described problems, an object of the present invention is to provide a moving information analyzing system, a camera, and a moving information analyzing method capable of generating an accurate moving information analysis image in which the privacy of a person shown in an imaging region is appropriately protected and staying information or passing information of the person is superimposed on a background image which is updated at a predetermined timing.

According to an aspect of the present invention, there is provided a moving information analyzing system including a camera, and a server that is connected to the camera, in which the camera includes an imaging section that captures an image of a predetermined imaging region;

a background image generating section that repeatedly generates a background image of a captured image of the imaging region at predetermined timings;

a moving information analyzing section that extracts moving information regarding a staying position or a passing position in the imaging region of a moving object included in the captured image; and a transmitter that transmits the background image generated by the background image generating section and the moving information of the moving object extracted by the moving information analyzing section to the server at a predetermined transmission cycle, and in which the server includes an image generating section that generates a moving information analysis image in which the moving information of the moving object is superimposed on the background image of the captured image; and a display control section that displays the moving information analysis image generated by the image generating section on a display unit.

According to the present invention, it is possible to generate an accurate moving information analysis image in which the privacy of a person shown in an imaging region is appropriately protected and staying information or passing information of the person is superimposed on a background image which is updated at a predetermined timing.

BRIEF DESCRIPTION OF DRAWINGS

FIG. 5 is a time chart illustrating operation timings of respective processes including image input, background image generation, and moving information analysis in the camera of the present exemplary embodiment.

FIG. 6 is a time chart corresponding to a case where the camera of the present exemplary embodiment periodically performs a transmission process.

DETAILED DESCRIPTION OF THE PREFERRED EMBODIMENTS

Hereinafter, a description will be made of a moving information analyzing system, a camera, and a moving information analyzing method according to an exemplary embodiment (hereinafter, referred to as "the present exemplary embodiment") of the present invention with reference to the drawings. The present invention may be defined as a moving information analysis image generating method including an operation (step) in which the camera generates a moving information analysis image (which will be described later).

Figure 1:
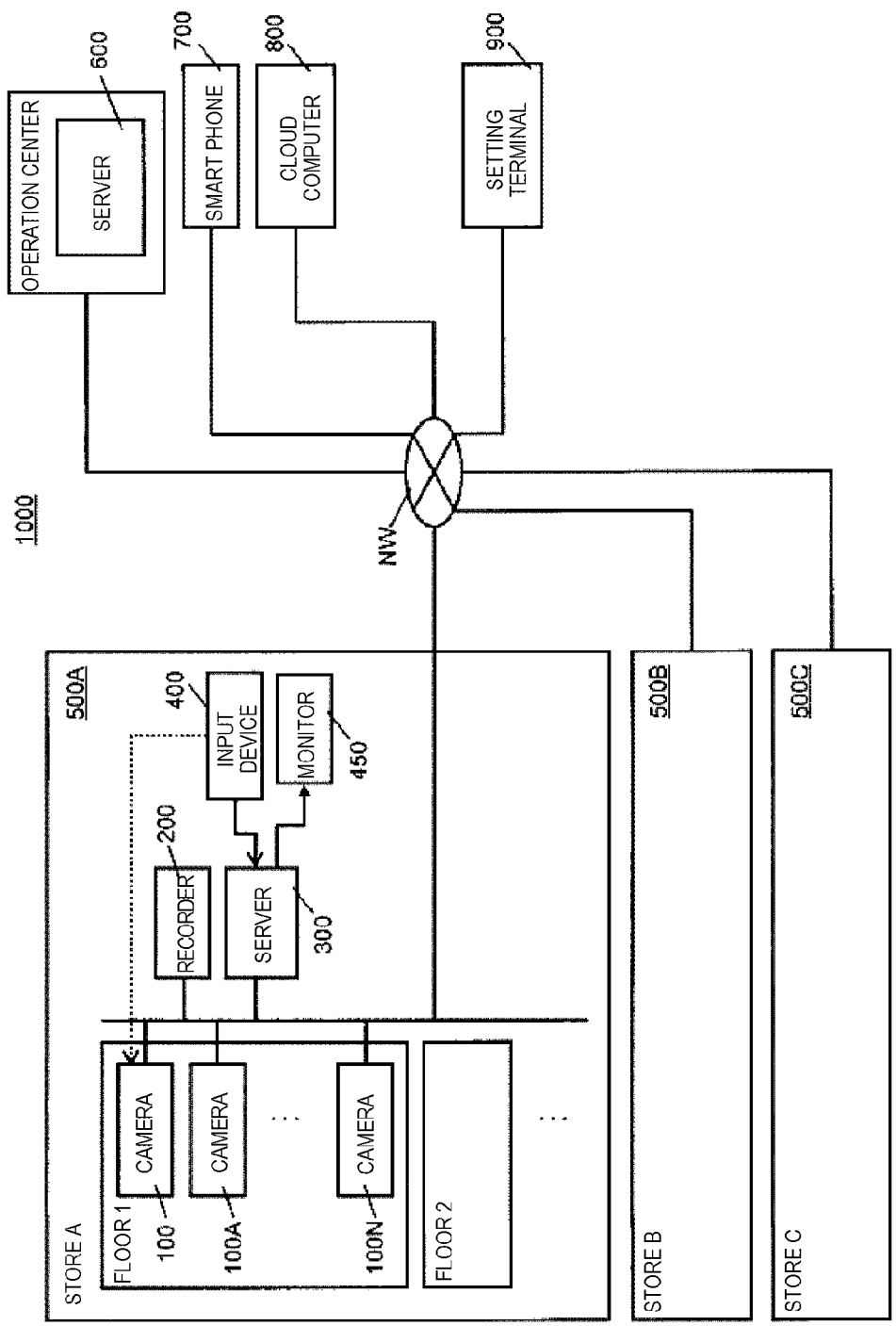
FIG. 1 is a system configuration diagram illustrating details of a configuration of a sales management system including a moving information analyzing system of the present exemplary embodiment.

In the following present exemplary embodiment, as illustrated in FIG. 1, a description thereof will be made, for example, assuming use of sales management system 1000 in which moving information analyzing systems 500A, 500B, 500C, . . . related to the present invention are respectively provided in a plurality of stores (store A, store B, store C, . . . ), and the plurality of moving information analyzing systems 500A, 500B, 500C, . . . are connected to each other via network NW. However, exemplary embodiments of the moving information analyzing system, a camera, and a moving information analyzing method related to the present invention are not limited to content of the present exemplary embodiment to be described later.

FIG. 1 is a system configuration diagram illustrating details of a configuration of sales management system 1000 including moving information analyzing systems 500A, 500B, 500C, . . . of the present exemplary embodiment. Sales management system 1000 illustrated in FIG. 1 includes moving information analyzing systems 500A, 500B, 500C, . . . which are respectively provided in a plurality of stores A, B, C, . . . , server 600 of an operation center, smart phone 700, cloud computer 800, and setting terminal 900.

Respective moving information analyzing systems 500A, 500B, 500C, . . . , server 600 of the operation center, smart phone 700, cloud computer 800, and setting terminal 900 are connected to each other via network NW.

Network NW is wireless network or a wired network. The wireless network is, for example, a wireless local area network (LAN), a wireless wide area network (WAN), 3G, long term evolution (LTE), or wireless gigabit (WiGig).

The wired network is, for example, an intranet or the Internet.

Moving information analyzing system 500A provided in store A illustrated in FIG. 1 includes a plurality of cameras 100, 100A, . . . , and 100N provided in floor 1, recorder 200, server 300, input device 400, and monitor 450. In the same manner as in floor 1, a plurality of cameras are provided in floor 2, and the cameras in floor 2 are not illustrated. Internal configurations of respective cameras 100, 100A, . . . , and 100N are the same as each other, and details thereof will be described later with reference to FIG. 2.

Recorder 200 is configured by using, for example, a semiconductor memory or a hard disk device, and stores data on an image captured by each of the cameras provided in store A (hereinafter, the image captured by the camera is referred to as a "captured image"). The data on the captured image stored in recorder 200 is provided for monitoring work such as crime prevention.

Server 300 is configured by using, for example, a personal computer (PC), and notifies camera 100 of the occurrence of a predetermined event (for example, a change in a layout of a sales area of floor 1 of store A) in response to an input operation performed by a user (who is a user of, for example, the moving information analyzing system and indicates a salesperson or a store manager of store A; this is also the same for the following description) who operates input device 400.

Server 300 generates a moving information analysis image in which moving information regarding a staying position or a passing position of a moving object (for example, a person such as a salesperson, a store manager, or a store visitor; this is also the same for the following description) in an imaging region of the camera (for example, camera 100) is superimposed on a captured image obtained by the camera (for example, camera 100) by using data (which will be described later) transmitted from the camera (for example, camera 100), and displays the image on monitor 450.

In addition, server 300 performs a predetermined process (for example, a process of generating a moving information analysis report which will be described later) in response to an input operation performed by the user operating input device 400, and displays the moving information analysis report on monitor 450. Details of an internal configuration of server 300 will be described later with reference to FIG. 2.

Input device 400 is configured by using, for example, a mouse, a keyboard, a touch panel, or a touch pad, and outputs a signal corresponding to a user's input operation to camera 100 or server 300. In FIG. 1, for simplification of illustration, an arrow is shown only between input device 400 and camera 100, but arrows may be shown between input device 400 and other cameras (for example, the cameras 100A and 100N).

Monitor 450 is configured by using, for example, a liquid crystal display (LCD) or an organic electroluminescence (EL) display, and displays data for a moving information analysis image or a moving information analysis report generated by server 300. Monitor 450 is provided as an external apparatus separately from server 300, but may be included in server 300.

Server 600 of the operation center is a viewing apparatus which acquires and displays moving information analysis images or moving information analysis reports generated by moving information analyzing systems 500A, 500B, 500C, . . . provided in respective stores A, B, C, . . . in response to an input operation performed by an employee (for example, an officer) of the operation center who operates server 600 of the operation center. Server 600 of the operation center holds various information pieces (for example, sales information, information regarding the number of visitors, event schedule information, the highest atmospheric temperature information, and the lowest atmospheric temperature information) required to generate a moving information analysis report (refer to FIG. 12). These various information pieces may be held in the servers provided in respective stores A, B, C, . . . . Server 600 of the operation center may perform each process which is performed by the server (for example, server 300 of store A) provided in each of stores A, B, C, . . . . Consequently, server 600 of the operation center can integrate data from respective stores A, B, C, . . . so as to generate a moving information analysis report (for example, refer to FIG. 12 to be described later) and thus to acquire specific data (for example, a moving information analysis report illustrated in FIG. 12) related to one store selected through an input operation on server 600 of the operation center, or to display a data comparison result between specific sales areas (for example, meat sales areas) of a plurality of stores.

Smart phone 700 is a viewing apparatus which acquires and displays moving information analysis images or moving information analysis reports generated by moving information analyzing systems 500A, 500B, 500C, . . . provided in respective stores A, B, C, . . . in response to an input operation performed by an employee (for example, a sales representative) of the operation center who operates smart phone 700.

Cloud computer 800 is online storage which stores data related to moving information analysis images or moving information analysis reports generated by moving information analyzing systems 500A, 500B, 500C, . . . provided in respective stores A, B, C, . . . , and performs a predetermined process (for example, retrieval and extraction of a moving information analysis report dated on the Y-th day of the X month) in response to an input operation performed by an employee (for example, a sales representative) of the operation center who operates smart phone 700 and transmits a process result to smart phone 700.

Setting terminal 900 is configured by using, for example, a PC, and can execute dedicated browser software for displaying a setting screen of the camera of moving information analyzing systems 500A, 500B, 500C, . . . provided in respective stores A, B, C, . . . . Setting terminal 900 displays a setting screen (for example, a common gateway interface (CGI)) of the camera by using the browser software in response to an input operation of an employee (for example, a system manager of sales management system 1000) of the operation center operating setting terminal 900, and sets information regarding the camera by editing (correcting, adding, and deleting) the information.

Camera

Figure 2:
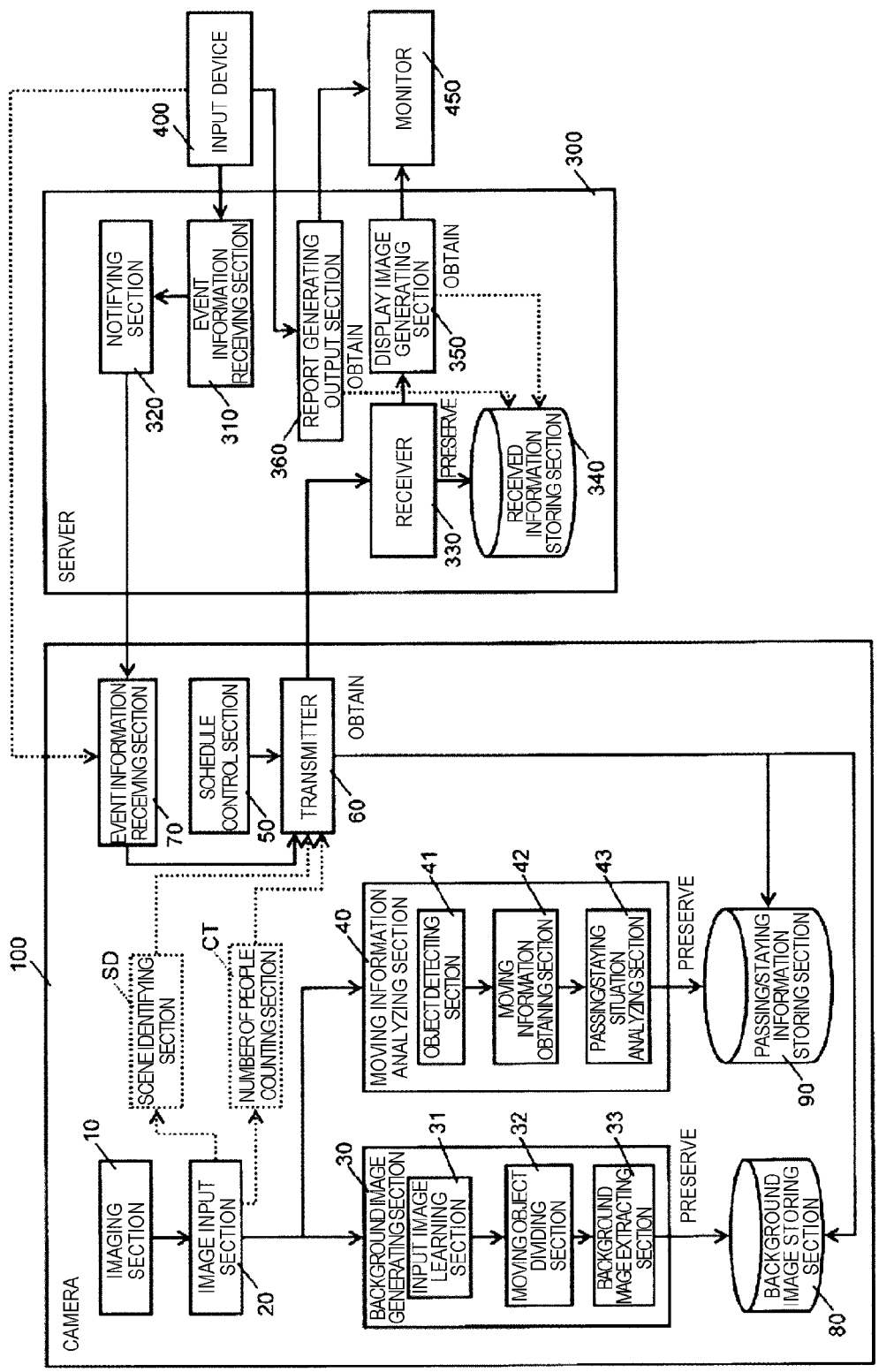
FIG. 2 is a block diagram illustrating details of a functional internal configuration of each of a camera and a server of the present exemplary embodiment.

FIG. 2 is a block diagram illustrating details of a functional internal configuration of both camera 100 and server 300 of the present exemplary embodiment. In sales management system 1000 illustrated in FIG. 1, the cameras provided in respective stores A, B, C, . . . have the same configuration, and thus camera 100 will be described as an example in FIG. 2.

Camera 100 illustrated in FIG. 2 includes imaging section 10, image input section 20, background image generating section 30, moving information analyzing section 40, schedule control section 50, transmitter 60, event information receiving section 70, background image storing section 80, and passing/staying information storing section 90. Background image generating section 30 includes input image learning section 31, moving object dividing section 32, and background image extracting section 33.

Moving information analyzing section 40 includes object detecting section 41, moving information obtaining section 42, and passing/staying situation analyzing section 43.

Imaging section 10 includes at least a lens and an image sensor. The lens collects light (light beams) which is incident from the outside of camera 100 and forms an image on an imaging surface of the image sensor. As the lens, a fish-eye lens, or a wide angle lens which can obtain an angle of view of 140 degrees or greater is used. The image sensor is a solid-state imaging element such as a charge-coupled device (CCD) or a complementary metal oxide semiconductor (CMOS), and converts an optical image formed on the imaging surface into an electric signal.

Image input section 20 is configured by using, for example, a central processing unit (CPU), a micro-processing unit (MPU), or a digital signal processor (DSP), and performs a predetermined signal process using the electric signal from imaging section 10 so as to generate data (frame) for a captured image defined by red, green, and blue (RGB) or YUV (luminance and color difference) which can be recognized by the human eye, and outputs the data to background image generating section 30 and moving information analyzing section 40.

Background image generating section 30 is configured by using, for example, a CPU, an MPU, or a DSP, and generates a background image obtained by removing a moving object (for example, a person) included in the captured image for every data items (frame) for the captured image output from image input section 20 at a predetermined frame rate (for example, 30 frames per second (fps)), and preserves the background image in background image storing section 80. The process of generating a background image in background image generating section 30 may employ an image processing method disclosed in, for example, Japanese Patent Unexamined Publication No. 2012-203680, but is not limited to this method.

Figure 3:
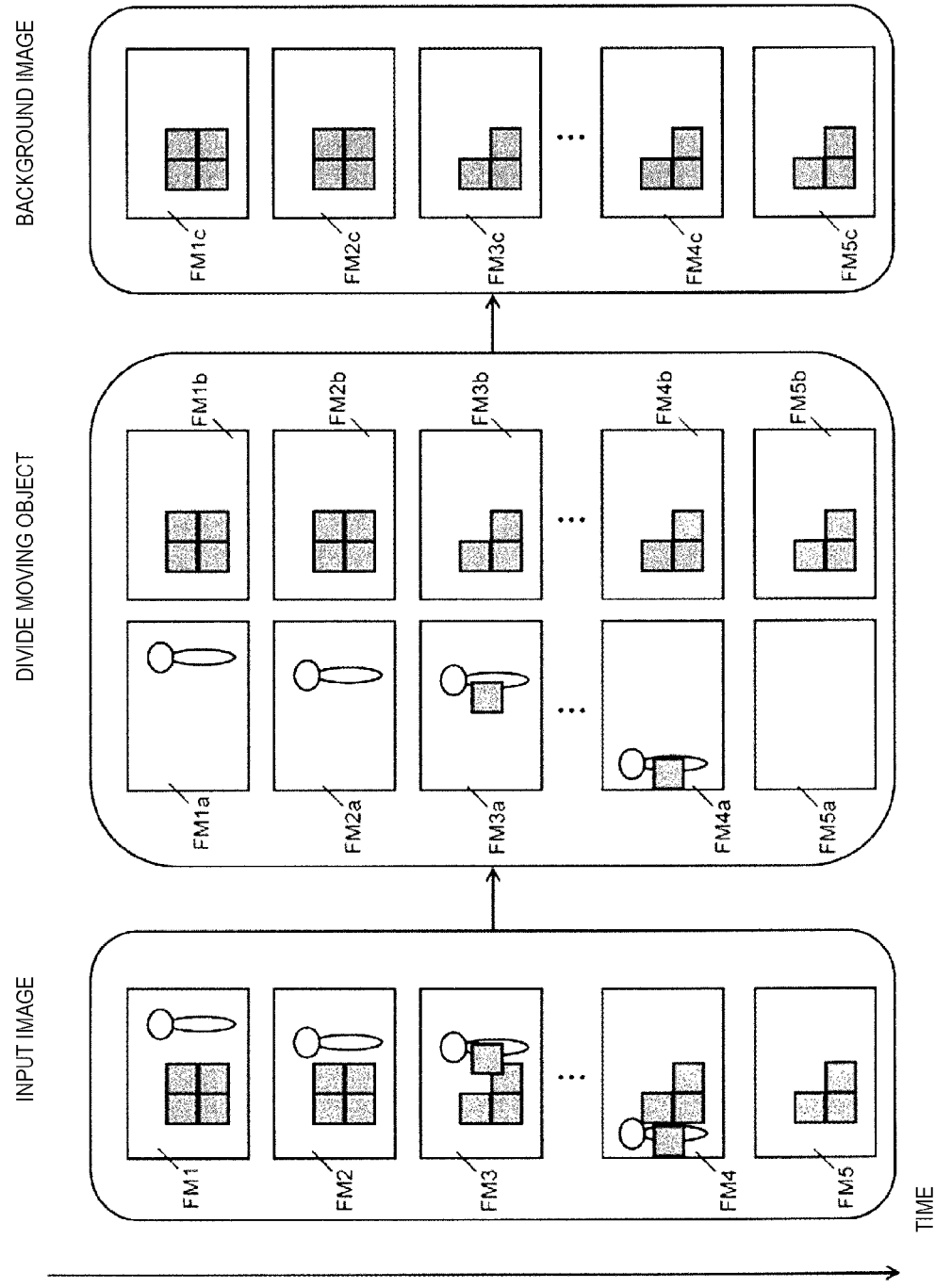
FIG. 3 is a diagram illustrating a summary of an operation of a background image generating section of the camera of the present exemplary embodiment.
Figure 4A:
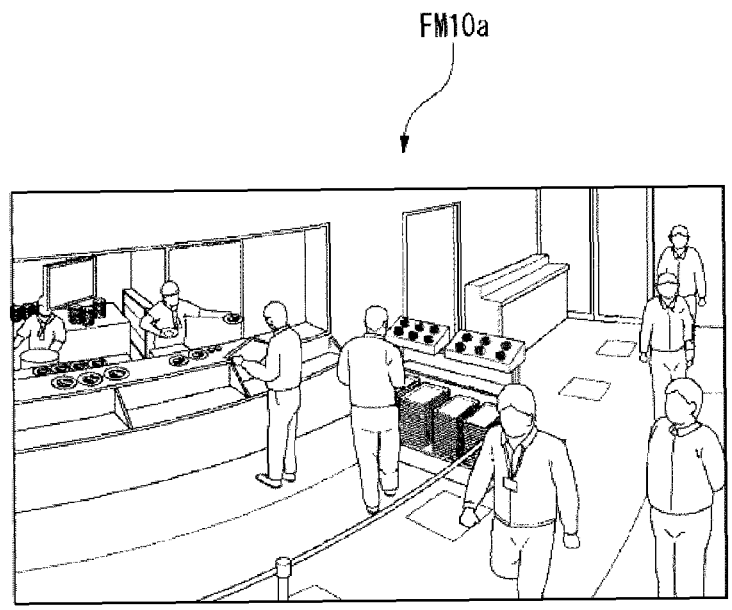
FIG. 4A is a diagram illustrating an example of a captured image which is input into an image input section.
Figure 4B:
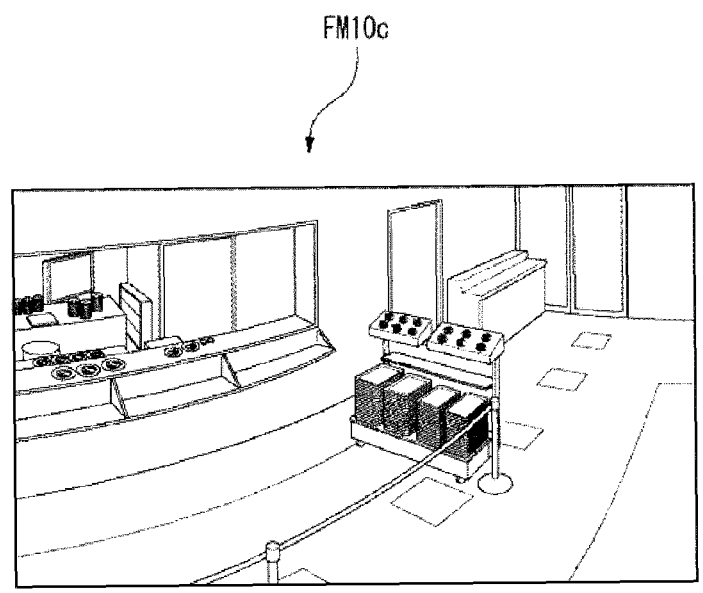
FIG. 4B is a diagram illustrating an example of a background image generated by the background image generating section.

Here, a summary of an operation of background image generating section 30 will be described briefly with reference to FIGS. 3 to 4B. FIG. 3 is a diagram illustrating a summary of an operation of background image generating section 30 of camera 100 according to the present exemplary embodiment. FIG. 4A is a diagram illustrating an example of a captured image which is input to image input section 20. FIG. 4B is a diagram illustrating an example of a background image generated by background image generating section 30.

FIG. 3 schematically illustrates results generated by input image learning section 31, moving object dividing section 32, and background image extracting section 33 from the left side to the right side of the figure perpendicular to a time axis which is directed from the top to the bottom of the figure, and illustrates a state in which a visitor to the store carries one corrugated cardboard among four corrugated cardboards for drinks.

Input image learning section 31 analyzes the distribution of luminance and color difference in each pixel in frames (for example, respective frames FM1 to FM5 illustrated in FIG. 3) of a plurality of captured images output from image input section 20.

Moving object dividing section 32 divides respective frames FM1 to FM5 of the captured images into information (for example, refer to frames FM1*a* to FM5*a*) regarding a moving object (for example, a person) and information (for example, refer to frames FM1*b* to FM5*b*) regarding a portion (for example, a background) other than the moving object, by using a result (that is, an analysis result of the distribution situation of the luminance and the color difference in each pixel of the plurality of frames (for example, in the time axis direction illustrated in FIG. 3)) of input image learning section 31. In frames FM3 and FM4 of the captured images showing a state in which the person as a moving object carries the corrugated cardboard, values of luminance and color differences corresponding to pixels of the corrugated cardboard carried by the person change in the time axis direction (for example, refer to FIG. 3), and thus moving object dividing section 32 regards the corrugated cardboard carried by the person as a moving object.

Background image extracting section 33 extracts frames FM1*b* to FM5*b* in which the information regarding the portion other than the moving object is shown among the information pieces divided by moving object dividing section 32, as frames FM1*c* to FM5*c* for background images corresponding to frames FM1 to FM5 of the captured images output from image input section 20, and preserves the frames in background image storing section 80.

In frame FM10*a* of a captured image illustrated in FIG. 4A, for example, a person providing food and a person receiving the food on a tray in a restaurant are shown as moving objects. In contrast with frame FM10*a* of the captured image illustrated in FIG. 4A, in frame FM10*c* (refer to FIG. 4B) of a background image generated by background image generating section 30, the person providing the food and the person receiving the food as moving objects in the same restaurant are removed so that neither of the two persons are shown.

Moving information analyzing section 40 is configured by using, for example, a CPU, an MPU, or a DSP, and detects moving information regarding a staying position or a passing position of a moving object (for example, a person) included in the captured image for every data item (frame) regarding the captured image output from image input section 20 at a predetermined frame rate (for example, 10 fps), and preserves the moving information in passing/staying information storing section 90.

Object detecting section 41 performs a predetermined image process (for example, a person detection process or a face detection process) on a frame of a captured image output from image input section 20 so as to detect the presence or absence of a moving object (for example, a person) included in the frame of the captured image. In a case where a moving object included in the frame of the captured image is detected, object detecting section 41 outputs information (for example, frame coordinate information) regarding a detection region of the moving object in the frame of the captured image, to moving information obtaining section 42. In a case where a moving object included in the frame of the captured image is not detected, object detecting section 41 outputs information (for example, predetermined null information) regarding a detection region of the moving object, to moving information obtaining section 42.

Moving information obtaining section 42 associates the present and past information pieces regarding the detection region with each other by using the information regarding the captured image output from image input section 20 and the past information (for example, captured image information or coordinate information) regarding the detection region of the moving object on the basis of the information regarding the detection region of the moving object output from object detecting section 41, and outputs the association result to passing/staying situation analyzing section 43 as moving information (for example, an amount of change in the coordinate information of the detection region of the moving object).

Passing/staying situation analyzing section 43 extracts and generates, from a plurality of captured images, moving information (for example, "object position information", "moving information", and "information regarding a passing situation or a staying situation") regarding a staying position or a passing position of the moving object (for example, a person) in the frame of the captured image on the basis of the moving information output from moving information obtaining section 42. Passing/staying situation analyzing section 43 may generate a color portion visualizing image of a moving information analysis image (heat map image) generated in display image generating section 350 of server 300 by using the extraction result of the moving information regarding the staying position or the passing position of the moving object (for example, a person).

By using moving information for frames of a plurality of captured images, passing/staying situation analyzing section 43 can extract and generate accurate moving information regarding a position where a moving object (for example, a person) stays or passes from the frames of the captured images which are output from image input section 20.

Schedule control section 50 is configured by using, for example, a CPU, an MPU, or a DSP, and gives, to transmitter 60, an instruction for a predetermined transmission cycle for periodically transmitting, to server 300, the background image data preserved in background image storing section 80 and the extraction result data of the moving information regarding the staying information or the passing information of the moving object preserved in passing/staying information storing section 90. The predetermined transmission cycle is, for example, 15 minutes, an hour, 12 hours, or 24 hours, and is not limited to such intervals.

Transmitter 60 obtains and transmits the background image data preserved in background image storing section 80 and the extraction result data of the moving information regarding the staying information or the passing information of the moving object preserved in passing/staying information storing section 90 to server 300 in response to the instruction from schedule control section 50 or event information receiving section 70. Transmission timing in transmitter 60 will be described later with reference to FIGS. 5 to 8.

Event information receiving section 70 as an example of an event information obtaining section receives (obtains) a notification of detection of a predetermined event (for example, a change in a layout of a sales area of floor 1 of store A) from server 300 or input device 400, and outputs, to transmitter 60, an instruction for transmitting, to server 300, the background image data preserved in background image storing section 80 and the extraction result data of the moving information regarding the staying information or the passing information of the moving object preserved in passing/staying information storing section 90 when receiving the notification of detection of the predetermined event.

Background image storing section 80 is configured by using, for example, a semiconductor memory or a hard disk device, and stores the data (frame) regarding the background image generated by background image generating section 30.

Passing/staying information storing section 90 is configured by using, for example, a semiconductor memory or a hard disk device, and stores the extraction result data (for example, "object position information", "moving information", and "information regarding a passing situation or a staying situation") of the moving information regarding the staying position or the passing position of the moving object (for example, a person), generated by moving information analyzing section 40.

Camera 100 illustrated in FIG. 2 may be provided with a scene identifying section SD which performs an operation as follows (for example, refer to FIG. 13) instead of event information receiving section 70. The scene identifying section SD as an example of an image change detecting section determines whether or not there is a change (for example, an event such as a change of a layout of a sales area of floor 1 of store A) in a captured image output from image input section 20. In a case where a change in the captured image is detected, the scene identifying section SD outputs, to transmitter 60, an instruction for transmitting, to server 300, the background image data preserved in background image storing section 80 and the extraction result data of the moving information regarding the staying information or the passing information of the moving object preserved in passing/staying information storing section 90.

Camera 100 illustrated in FIG. 2 may be further provided with number of people counting section CT which performs an operation as follows (for example, refer to FIG. 13). Number of people counting section CT as an example of a moving object detecting section performs a predetermined image process (for example, a person detecting process) on a captured image output from image input section 20 so as to count the number of detected moving objects included in the captured image. Number of people counting section CT outputs information regarding the number of detected moving objects included in the captured image to transmitter 60.

Server

Server 300 illustrated in FIG. 2 includes event information receiving section 310, notifying section 320, receiver 330, received information storing section 340, display image generating section 350, and report generating output section 360.

In a case where information indicating that a predetermined event (for example, a change of a layout of a sales area of floor 1 of store A) has occurred for each corresponding camera (for example, camera 100) and is input from input device 400, event information receiving section 310 receives a notification of detection of the predetermined event. Event information receiving section 310 outputs information indicating that the notification of detection of the predetermined event has been received, to notifying section 320. The information indicating that a predetermined event has occurred includes an identification number (for example, C1, C2, . . . which will be described later) of the camera which images a location where the predetermined event has occurred as an imaging region.

Notifying section 320 transmits the notification of detection of the predetermined event, output from event information receiving section 310, to a corresponding camera (for example, camera 100).

Receiver 330 receives the data (that is, the background image data preserved in background image storing section 80 and the extraction result data of the moving information regarding the staying information or the passing information of the moving object preserved in passing/staying information storing section 90) transmitted from transmitter 60 of camera 100, and outputs the data to received information storing section 340 and display image generating section 350.

Received information storing section 340 is configured by using, for example, a semiconductor memory or a hard disk device, and stores the data (that is, the background image data preserved in background image storing section 80 and the extraction result data of the moving information regarding the staying information or the passing information of the moving object preserved in passing/staying information storing section 90) received by the receiver 330.

Display image generating section 350 as an example of an image generating section is configured by using, for example, a CPU, an MPU, or a DSP, and generates a moving information analysis image in which the moving information regarding the staying position or the passing position of the moving object is superimposed on the background image by using the data (that is, the background image data preserved in background image storing section 80 and the extraction result data of the moving information regarding the staying information or the passing information of the moving object preserved in passing/staying information storing section 90) is obtained from receiver 330 or received information storing section 340.

The moving information analysis image is an image in which the moving information visually indicating a location at which a moving object stays or a location through which the moving object passes is quantitatively visualized within a predetermined range (for example, values of 0 to 255) such as in a heat map in an imaging region corresponding to a captured image on the background image obtained by removing the moving object which thus is not shown from the captured image acquired by camera 100.

In addition, display image generating section 350 as an example of a display control section displays the generated moving information analysis image on monitor 450.

Report generating output section 360 as an example of a report generating section is configured by using, for example, a CPU, an MPU, or a DSP, and generates a moving information analysis report (for example, refer to FIG. 12) which will be described later in a case where an instruction for generating the moving information analysis report is input from input device 400. Report generating output section 360 as an example of a display control section displays the generated moving information analysis report on monitor 450.

Process of Transmitting Data from Camera to Server

Next, with reference to FIGS. 5 to 8, a description will be made of a process of transmitting data from camera 100 to server 300.

Figure 7:
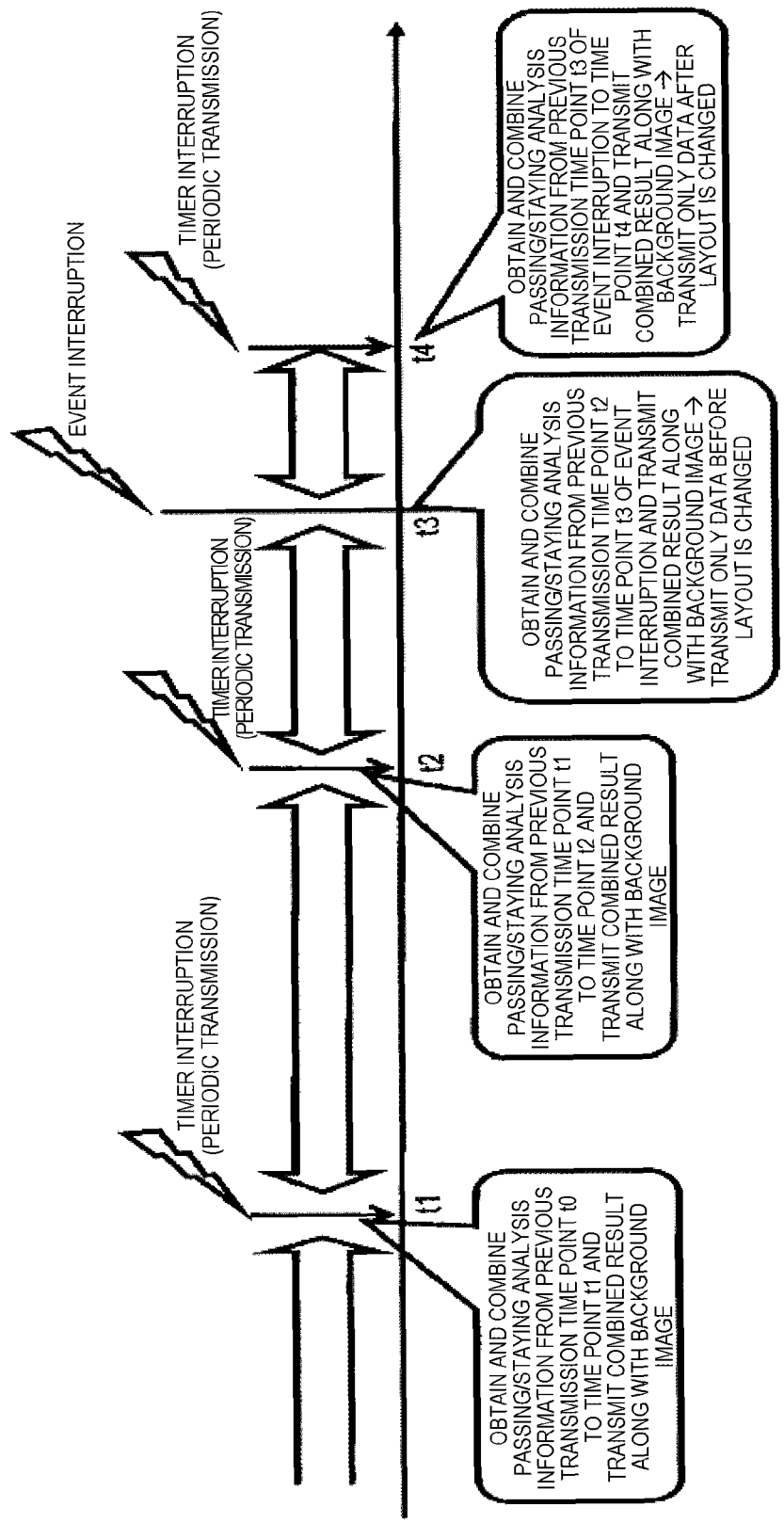
FIG. 7 is a time chart corresponding to a case where the camera of the present exemplary embodiment changes operation timing of the transmission process in response to detection of an event.
Figure 8:
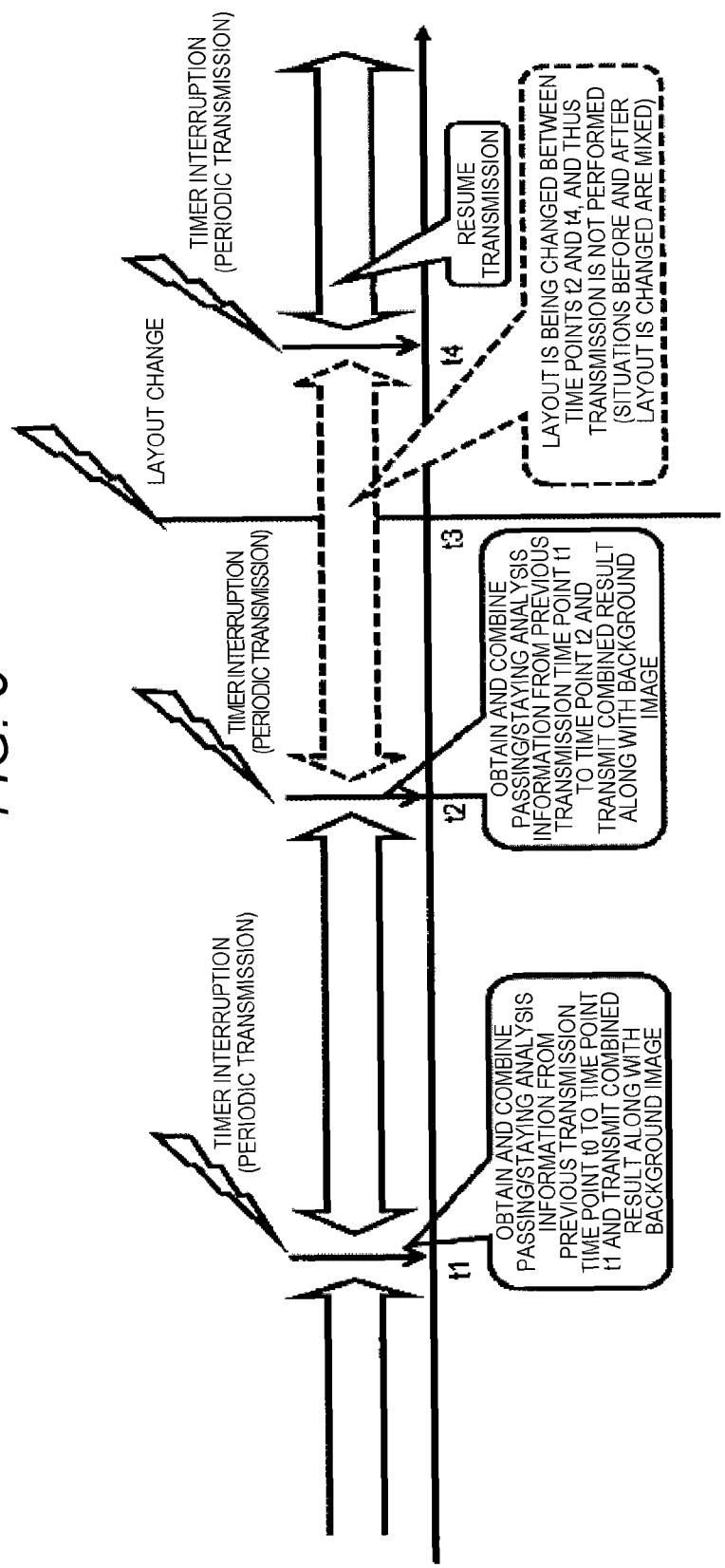
FIG. 8 is a time chart corresponding to a case where the camera of the present exemplary embodiment omits the transmission process before and after an event is detected.

FIG. 5 is a time chart illustrating operation timings of a transmission process in camera 100 of the present exemplary embodiment. FIG. 6 is a time chart corresponding to a case where camera 100 of the present exemplary embodiment periodically performs the transmission process. FIG. 7 is a time chart corresponding to a case where camera 100 of the present exemplary embodiment changes an operation timing of the transmission process in response to detection of an event. FIG. 8 is a time chart corresponding to a case where camera 100 of the present exemplary embodiment omits the transmission process before and after an event is detected.

In FIG. 5, in camera 100, if a captured image is output from image input section 20 (image input), background image generating section 30 generates a background image of the captured image output from image input section 20 (background image generation) and preserves the background image in background image storing section 80, and moving information analyzing section 40 extracts moving information regarding a staying position or a passing position of a moving object (for example, a person) included in the captured image output from image input section 20 (moving information analysis). The respective processes such as the image input the background image generation, and the moving information analysis are periodically and repeatedly performed.

For example, after the initial respective processes such as the image input, the background image generation, and the moving information analysis illustrated in FIG. 5 are performed, for example, as illustrated in FIG. 7, at an end point of a transmission cycle for which an instruction is given by schedule control section 50, transmitter 60 receives, for example, timer interruption from schedule control section 50, obtains the background image data preserved in background image storing section 80 and the extraction result data of the moving information regarding the staying information or the passing information of the moving object preserved in passing/staying information storing section 90 from previous transmission time point t0 to present transmission time point t1, and transmits the data to server 300 (time point t1). As described above, a periodic transmission interval (transmission cycle) in transmitter 60 is 15 minutes, an hour, 12 hours, 24 hours, or the like, and an instruction therefor is given by schedule control section 50 in advance. The background image data transmitted by transmitter 60 may be data corresponding to a single background image or may be data corresponding to a plurality of background images (for example, a plurality of background images obtained at intervals of five minutes).

Next, when the second and subsequent respective processes such as the image input, the background image generation, and the moving information analysis illustrated in FIG. 5 are performed, for example, as illustrated in FIG. 7, at an end point of a transmission cycle for which an instruction is given by schedule control section 50, transmitter 60 receives, for example, timer interruption from schedule control section 50, obtains the background image data preserved in background image storing section 80 and the extraction result data of the moving information regarding the staying information or the passing information of the moving object preserved in passing/staying information storing section 90 from previous transmission time point t1 to present transmission time point t2, and transmits the data to server 300 (time point t2).

For example, as illustrated in FIG. 7, if a notification of detection of a predetermined event (for example, a change in a layout of a sales area of floor 1 of store A) is received from event information receiving section 70 (time point t3), transmitter 60 receives, for example, event interruption from event information receiving section 70, obtains the background image data preserved in background image storing section 80 and the extraction result data of the moving information regarding the staying information or the passing information of the moving object preserved in passing/staying information storing section 90 from previous transmission time point t2 to present transmission time point t3, and transmits the data to server 300 (time point t3). A transmission process in transmitter 60 may be performed by using not only the method illustrated in FIG. 7 but also either of the methods illustrated in FIGS. 6 and 8.

In FIGS. 6 to 8, description of the same content as that of the transmission process illustrated in FIG. 5 will be made briefly or omitted, and different content will be described. Specifically, in FIG. 6, even if event interruption is received from event information receiving section 70 at time point t3, transmitter 60 does not transmit the background image data preserved in background image storing section 80 and the extraction result data of the moving information regarding the staying information or the passing information of the moving object preserved in passing/staying information storing section 90 from previous transmission time point t2 to present transmission time point t3 to server 300 (time point t3).

However, in the transmission process illustrated in FIG. 6, in a case where a predetermined event occurs from time point t2 to time point t3, since content of a captured image is updated, different background images are used together before and after the event is detected, and thus there is a possibility that the content of a moving information analysis image may not be accurate.

Therefore, in FIG. 7, if a notification of detection of a predetermined event (for example, a change in a layout of a sales area of floor 1 of store A) is received from event information receiving section 70 (time point t3), transmitter 60 receives, for example, event interruption from event information receiving section 70, obtains the background image data preserved in background image storing section 80 and the extraction result data of the moving information regarding the staying information or the passing information of the moving object preserved in passing/staying information storing section 90 from previous transmission time point t2 to present transmission time point t3 at which the event interruption is received, and transmits the data to server 300 (time point t3). At an end point of a transmission cycle for which an instruction is given by schedule control section 50, transmitter 60 receives, for example, timer interruption from schedule control section 50, obtains the background image data preserved in background image storing section 80 and the extraction result data of the moving information regarding the staying information or the passing information of the moving object preserved in passing/staying information storing section 90 from previous transmission time point t3 at which the event interruption is received to present transmission time point t4, and transmits the data to server 300 (time point t4).

In FIG. 8, even if event interruption is received from event information receiving section 70 at time point t3, transmitter 60 does not transmit the background image data preserved in background image storing section 80 and the extraction result data of the moving information regarding the staying information or the passing information of the moving object preserved in passing/staying information storing section 90 from previous transmission time point t2 to present transmission time point t3 at which the event interruption is received to server 300 (time point t3).

At an end point of a transmission cycle for which an instruction is given by schedule control section 50, transmitter 60 receives, for example, timer interruption from schedule control section 50, and does not transmit the background image data preserved in background image storing section 80 and the extraction result data of the moving information regarding the staying information or the passing information of the moving object preserved in passing/staying information storing section 90 from previous transmission time point t3 at which the event interruption is received to present transmission time point t4, to server 300 (time point t4).

In other words, in a case where the event interruption is received from event information receiving section 70 at time point t3, transmitter 60 does not transmit the background image data preserved in background image storing section 80 and the extraction result data of the moving information regarding the staying information or the passing information of the moving object preserved in passing/staying information storing section 90 from previous transmission time point t2 up to a start point (t4 in FIG. 8) of a transmission cycle after the event interruption is received, to server 300 (from time point t2 to time point t4).

In FIG. 8, for example, if timer interruption is received from schedule control section 50 (time point t4), transmitter 60 resumes transmission of the background image data preserved in background image storing section 80 and the extraction result data of the moving information regarding the staying information or the passing information of the moving object preserved in passing/staying information storing section 90 to server 300. Specifically, although not illustrated in FIG. 8, at an end point of a transmission cycle for which an instruction is given by schedule control section 50 after time point t4, transmitter 60 receives, for example, timer interruption from schedule control section 50, obtains the background image data preserved in background image storing section 80 and the extraction result data of the moving information regarding the staying information or the passing information of the moving object preserved in passing/staying information storing section 90 from time point t4 to present transmission time point, and transmits the data to server 300.

Figure 9:
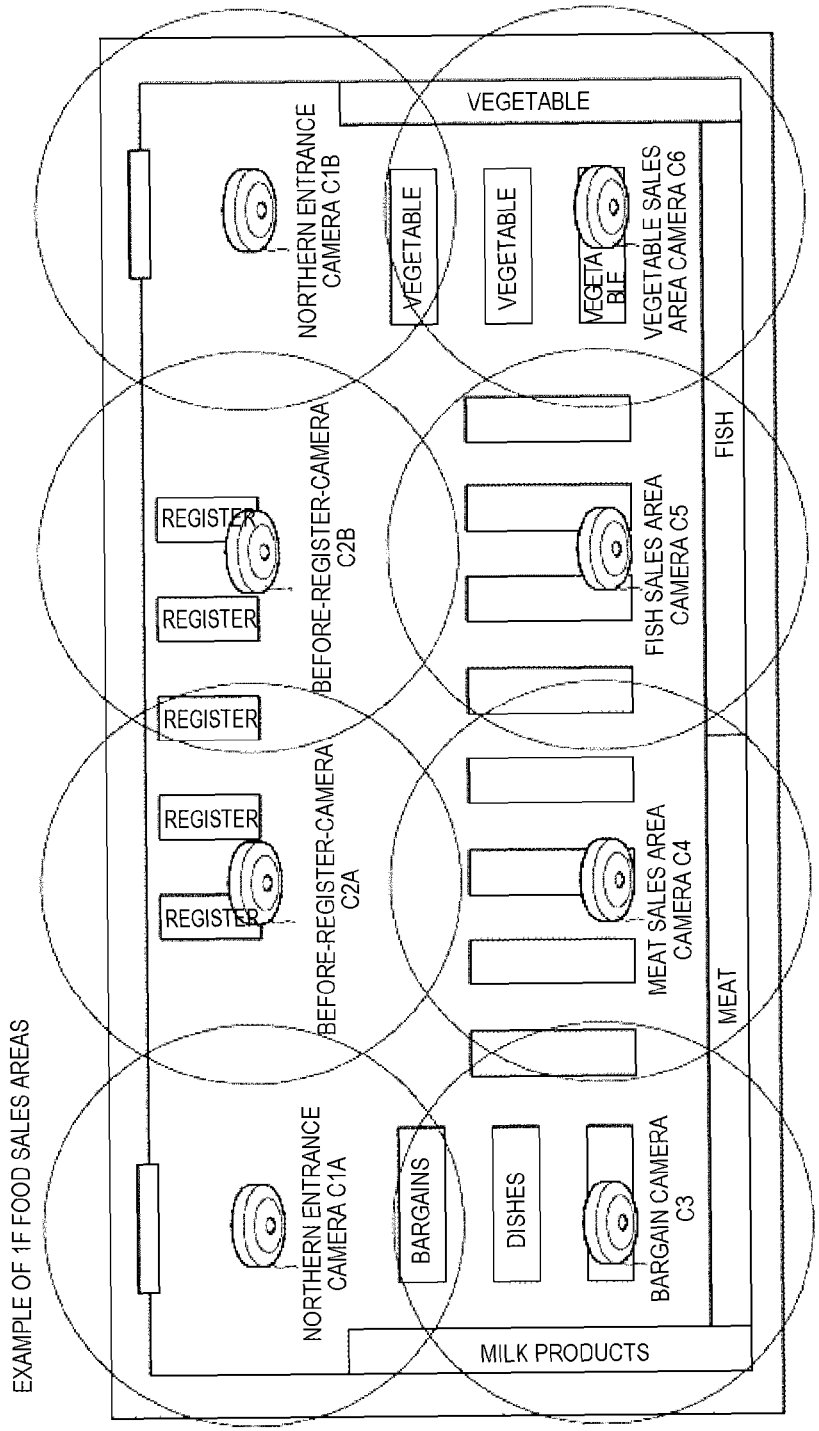
FIG. 9 is a diagram illustrating an example of a layout of a food sales area in which the camera of the present exemplary embodiment is provided in plurality.

FIG. 9 is a diagram illustrating an example of a layout of a food sales area where camera 100 of the present exemplary embodiment is provided in plurality. FIG. 9 illustrates a state in which, for example, in the food sales area of floor 1 (1F) of store A, a plurality of (for example, eight) cameras are provided on a ceiling surface above floor 1. Specifically, a total of eight cameras (for example, omnidirectional cameras) including northern entrance cameras C1A and C1B, before-register-cameras C2A and C2B, a bargain camera C3, a meat sales area camera C4, a fish sales area camera C5, and a vegetable sales area camera C6 are provided. The type of camera is not limited to the omnidirectional camera, and may be a fixed camera in which a fixed angle of view is set, or may be a PTZ (pan, tilt, and zoom) camera having a panning function, a tilting function, and a zooming function.

Figure 10:
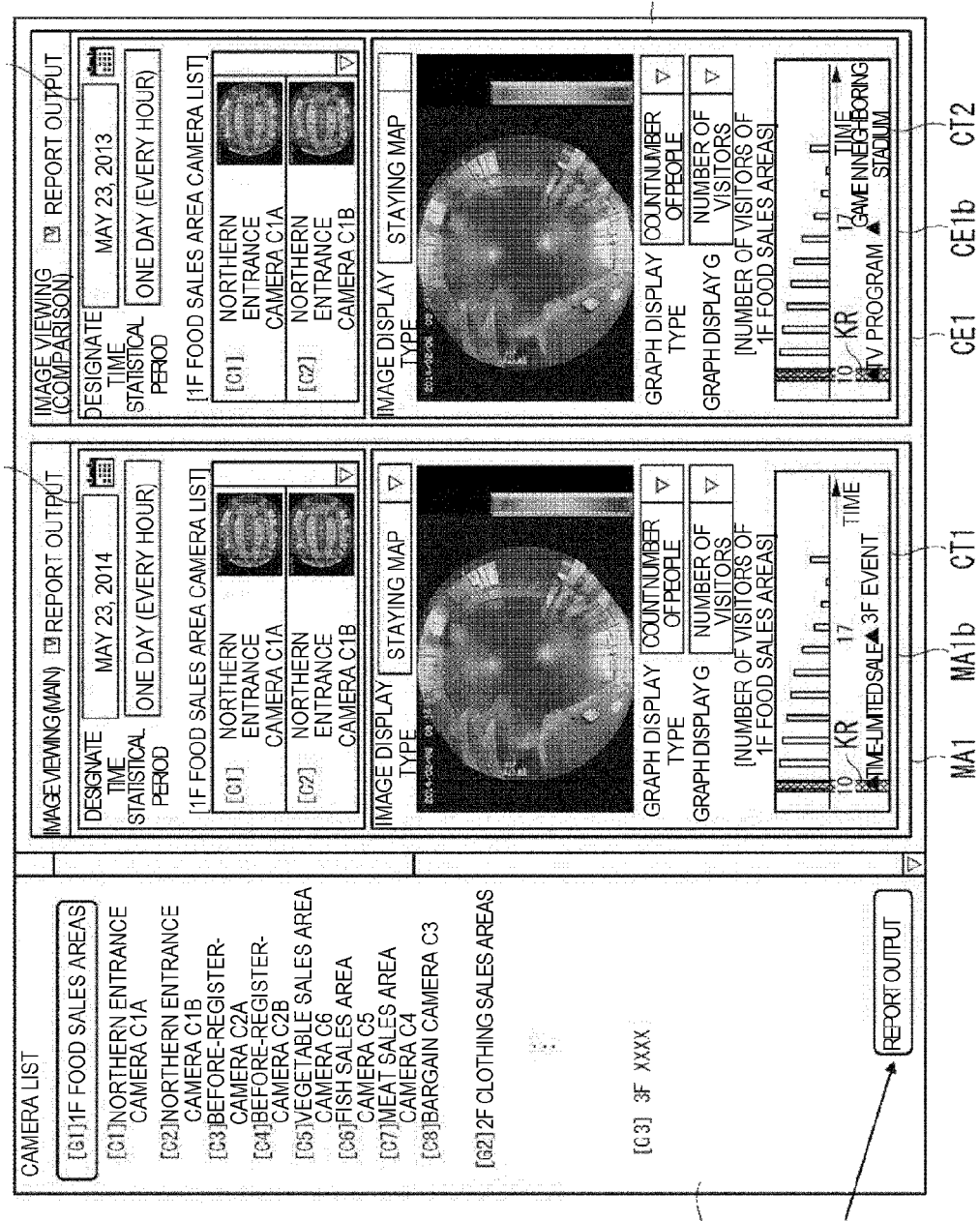
FIG. 10 is a diagram illustrating an example of an operation screen including a moving information analysis image of a store, generated by a display image generating section of the server of the present exemplary embodiment.
Figure 11:
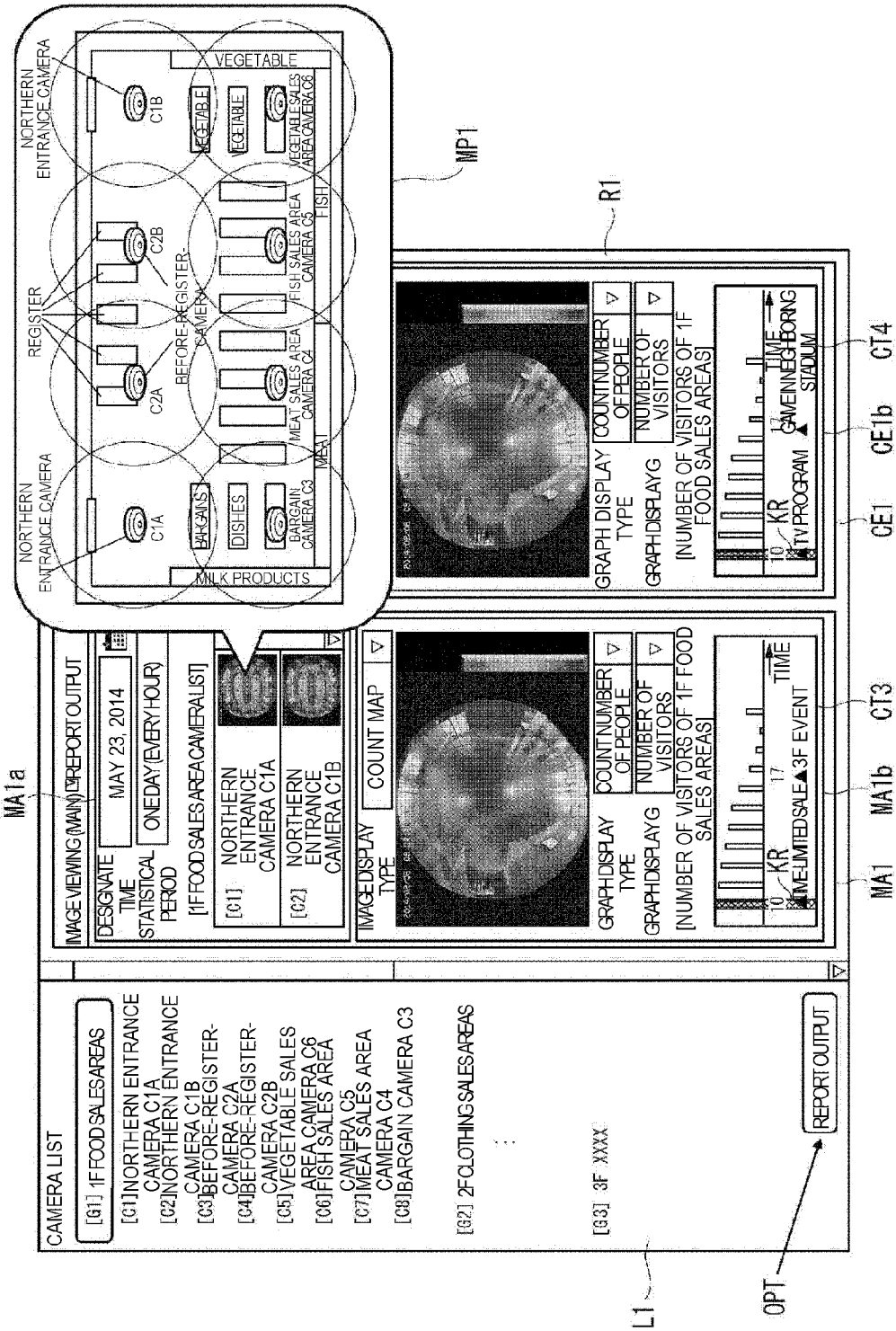
FIG. 11 is a diagram illustrating another example of an operation screen including a moving information analysis image of the store, generated by the display image generating section of the server of the present exemplary embodiment.

FIG. 10 is a diagram illustrating an example of an operation screen including a moving information analysis image of store A, generated by display image generating section 350 of server 300 of the present exemplary embodiment. FIG. 11 is a diagram illustrating another example of an operation screen including a moving information analysis image of store A, generated by display image generating section 350 of server 300 of the present exemplary embodiment. The operation screens illustrated in FIGS. 10 and 11 are displayed on monitor 450 by display image generating section 350.

On the operation screen illustrated in FIG. 10, a list of screens for selecting the cameras provided in the store is hierarchically shown in left display region L1. For example, in the food sales area (identification number: G1) of floor 1 (1F), northern entrance camera Cnorthern entrance camera C1A (identification number: C1), northern entrance camera C1B (identification number: C2), before-register-camera C2A (identification number: C3), before-register-camera C2B (identification number: C4), vegetable sales area camera C6 (identification number: C5), fish sales area camera C5 (identification number: C6), meat sales area camera C4 (identification number: C7), and bargain camera C3 (identification number: C8) are shown hierarchically. This is also the same for a clothing sales area of floor 2 (2F) and other sales areas, and thus description thereof will be omitted.

On the operation screen illustrated in FIG. 10, display region MA1 of main (for example, present) moving information analysis information and display region CE1 of subsidiary (for example, comparison) moving information analysis information are displayed in right display region R1.

In display region MA1 of moving information analysis information, a designated condition display region MA1a including a designated time (including the date) at which server 300 generates a viewing object moving information analysis image, a statistical period indicating, for example, the unit of half a day, the unit of a day, the unit of one week, or the unit of one month, and a screen for selecting the cameras of each sales area selected in display region L1, and a moving information analysis result display region MA1b including an image display type of a moving information analysis image, a graph display type, a graph display G (group), and display region CT1 of the number of visitors of each sales area, are displayed.

The image display type of a moving information analysis image includes a staying map, illustrated in FIG. 10, in which staying information of a moving object (for example, a person) is shown, a count map, illustrated in FIG. 11, in which passing information of a moving object (for example, a person) is shown, and captured images thereof. The number of moving objects (for example, persons) detected by the number of people counting section CT in time series (for example, every hour in FIGS. 10 and 11) is shown in display region CT1 of the number of visitors of each sales area.

For example, if input device 400 shifts selection bar KR displayed in display region CT1 of the number of visitors of each sales area in the time direction through a user's input operation, display image generating section 350 sequentially displays moving information analysis images which are generated at time points indicated by selection bar KR.

As illustrated in FIG. 11, instead of the screen for selecting the cameras of each sales area in display region MA1 of moving information analysis information, an example of layout MP1 in which the plurality of cameras illustrated in FIG. 9 are provided in each sales area may be displayed.

Similarly, on display screen CE1 of subsidiary moving information analysis information, designated condition display region CE1a, as a comparison target of display region MA1 of main moving information analysis information, including a designated time (including the date) at which server 300 generates a viewing object moving information analysis image a statistical period indicating, for example, the unit of half a day, the unit of a day, the unit of one week, or the unit of one month, and a screen for selecting the cameras of each sales area selected in display region MA1 of main moving information analysis information, and moving information analysis result display region CE1b including an image display type of a moving information analysis image, a graph display type, a graph display G (group), and display region CT2 of the number of visitors of each sales area, are displayed. In a case of using display screen CE1 of subsidiary moving information analysis information, for example, not only comparison between states before and after a layout in the store is changed but also usage such as comparison between states before and after a discount seal is attached to merchandise, comparison between states before and after a time-limited sale is performed, comparison a date and the same date in the previous year, and comparison between stores (for example, comparison between a meat sales area of store A and a meat sales area of store B) may be included.

The number of moving objects (for example, persons) detected by number of people counting section CT in time series (for example, every hour in FIGS. 10 and 11) is shown in display region CT2 of the number of visitors of each sales area. For example, if input device 400 shifts selection bar KR displayed in display region CT2 of the number of visitors of each sales area in the time direction through a user's input operation, display image generating section 350 sequentially reproduces and displays moving information analysis images which are generated at time points indicated by selection bar KR.

Input device 400 can designate a specific time zone on the time axis and can input a comment (for example, a time-limited sale, a 3F event, a TV program, and a game in a neighboring stadium), through a user's input operation, to display region CT1 of the number of visitors of each sales area of display region MA1 of main (for example, present) moving information analysis information and display region CT2 of the number of visitors of each sales area of display region CE1 of subsidiary (for example, comparison) moving information analysis information.

In FIG. 11, the remaining content is the same as that described with reference to FIG. 10 except that the image display type is a count map, and thus detailed description thereof will be omitted. In the same manner as in FIG. 10, also in FIG. 11, for example, if input device 400 shifts selection bar KR displayed in each of display regions CT3 and CT4 of the number of visitors of each sales area in the time direction through a user's input operation, display image generating section 350 sequentially reproduces and displays moving information analysis images which are generated at time points indicated by selection bar KR.

Figure 12:
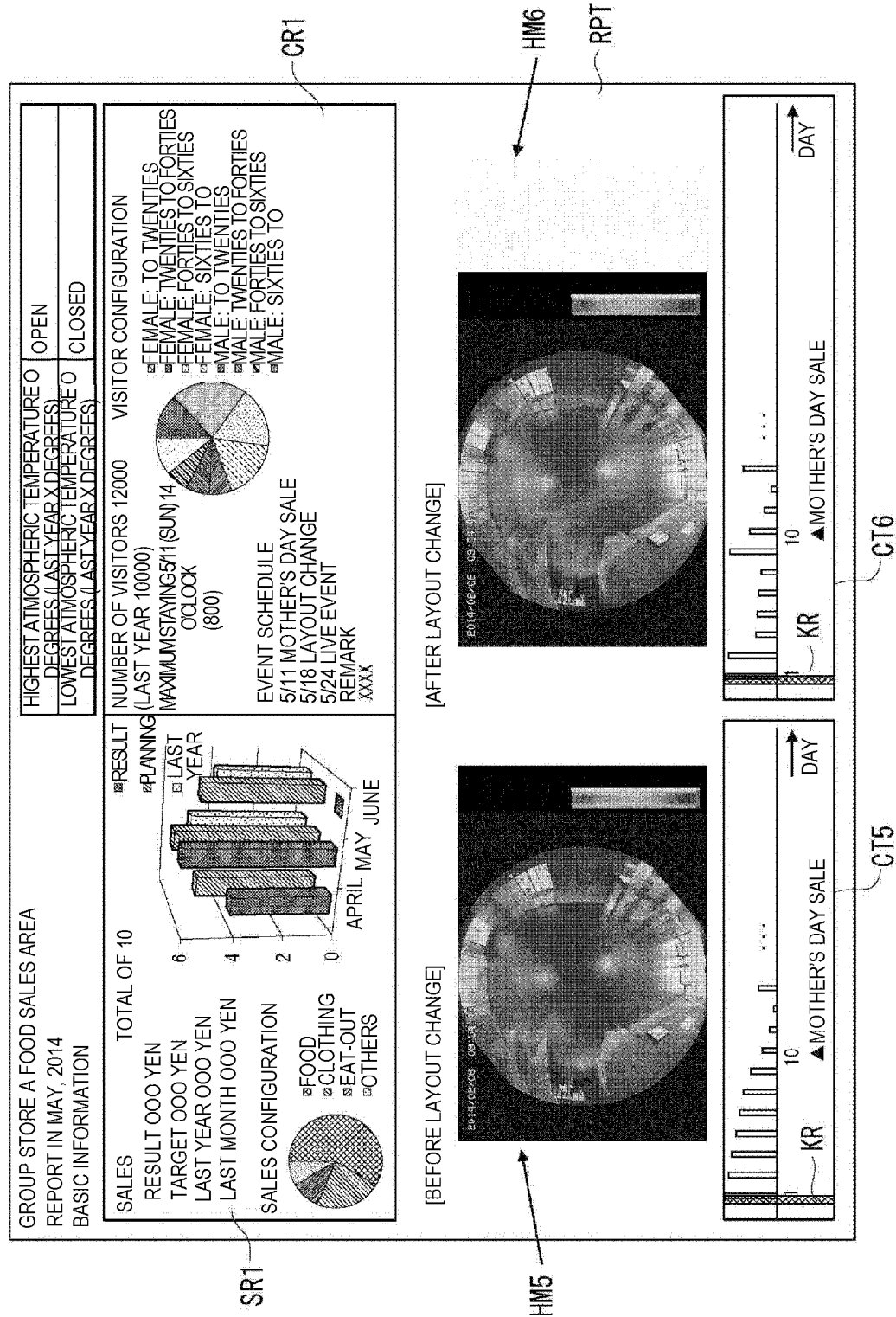
FIG. 12 is a diagram illustrating an example of an operation screen of a monthly report related to a food sales area of the store, dated in May, 2014, generated by a report generating output section of the server of the present exemplary embodiment.

FIG. 12 is a diagram illustrating an example of an operation screen RPT of a monthly report related to a food sales area of store A, dated May, 2014, generated by report generating output section 360 of server 300 of the present exemplary embodiment. The monthly report (refer to FIG. 12) as an example of a moving information analysis report of the present exemplary embodiment is a screen which is generated by report generating output section 360 and is displayed on monitor 450 when a report output button OPT provided on the lower part of left display region L1 of the operation screen illustrated in FIG. 10 or FIG. 11 is pressed via input device 400. Report generating output section 360 of server 300 may output the monthly report illustrated in FIG. 12 or partial information thereof (for example, a monthly report of a meat sales area among the food sales areas) from a printer (not illustrated) provided in store A. Consequently, a salesperson in store A can receive the printed and distributed monthly report of, for example, all the food sales areas or the meat sales area as a part thereof, in the form of a moving information analysis image in which a visitor is not shown being output.

The operation screen RPT of the monthly report (the moving information analysis report) illustrated in FIG. 12 shows various information pieces including a title of the monthly report, information regarding an atmospheric temperature, a display region SR1 related to sales information, display region CR1 related to statistical information such as the number of visitors of a store (for example, store A), display regions of moving information analysis images HM5 and HM6 generated by display image generating section 350 before and after a layout of the sales area is changed as an example of a predetermined event, and display regions CT5 and CT6 of the number of visitors of each sales area. The various information pieces including the title of the monthly report, the information regarding the atmospheric temperature, the sales information, the event information, the information regarding a configuration of the visitors, and the like are transmitted, for example, from server 600 of the operation center to a server (for example, server 300) of a corresponding store (for example, store A). The various information pieces including the title of the monthly report, the information regarding the atmospheric temperature, the sales information, the event information, the information regarding a configuration of the visitors, and the like may be stored in server 300 or a storing section (not illustrated) of the store in advance.

Also in the operation screen RPT of the monthly report illustrated in FIG. 12, in the same manner as in FIG. 10 or FIG. 11, for example, if input device 400 shifts selection bar KR displayed in each of display regions CT5 and CT6 of the number of visitors of each sales area in the time direction through a user's input operation, display image generating section 350 sequentially displays moving information analysis images which are generated at time points indicated by selection bar KR.

As mentioned above, in moving information analyzing system 500A of the present exemplary embodiment, camera 100 generates a background image of a captured image of a predetermined imaging region, extracts moving information regarding a staying position or a passing position in the imaging region of a moving object (for example, a person) included in the captured image, and transmits the background image of the captured image and the moving information of the moving object to server 300 at a predetermined transmission cycle. Server 300 generates a moving information analysis image in which the moving information of the moving object is superimposed on the background image of the captured image, and displays the moving information analysis image on monitor 450.

Consequently, moving information analyzing system 500A generates the background image which is a base of the moving information analysis image so that the moving object (for example, a person) is removed so as not to be shown therein, and can thus appropriately protect the privacy of the moving object (the person) shown in an imaging region when the moving information analysis image is generated. Since moving information analyzing system 500A superimposes the moving information regarding the staying position or the passing position in the imaging region of the moving object (the person) on the background image which has already been updated at a predetermined timing (for example, the time at which a periodic transmission cycle arrives), it is possible to visually display a moving information analysis image which appropriately indicates accurate moving information regarding the staying position or the passing position in the imaging region of the moving object to a user at a predefined transmission cycle in a state in which the moving object is removed from the captured image.

Since moving information analyzing system 500A gives, to schedule control section 50 of the camera, an instruction for a predetermined transmission cycle for transmitting a background image and moving information of a moving object, it is possible to periodically transmit the background image and the moving information of the moving object to server 300 according to the transmission cycle for which the instruction is given in advance.

Since moving information analyzing system 500A transmits a background image and moving information of a moving object to server 300 when receiving a notification of detection of a predetermined event (for example, an event such as a change of a layout of a sales area in a store) from event information receiving section 70, server 300 can generate a moving information analysis image in which moving information regarding staying positions or passing positions of a moving object in an imaging region before and after the time at which the predetermined event is detected is accurately reflected.

Since moving information analyzing system 500A transmits a background image and moving information of a moving object to server 300 when the scene identifying section SD detects a change (for example, a change of a layout of a sales area in a store) in a captured image, server 300 can generate a moving information analysis image in which moving information regarding staying positions or passing positions of a moving object in an imaging region before and after the time at which the change in the captured image is detected is accurately reflected.

In moving information analyzing system 500A, since the people counting section CT counts the number of detected moving objects included in a captured image and outputs information regarding the number of detected moving objects to transmitter 60, it is possible to display a moving information analysis image including information regarding staying positions or passing positions of a moving object in an imaging region and a display screen (operation screen) including the number of detected moving objects on monitor 450.

Since moving information analyzing system 500A does not transmit a background image and moving information of a moving object at a transmission cycle including the time at which event information receiving section 70 receives a notification of detection of a predetermined event, it is possible to prevent moving information pieces regarding staying positions or passing positions of a moving object in an imaging region before and after the predetermined event (for example, a change in a layout of a sales area in a store) is detected from being used together when server 300 generates a moving information analysis image.

In moving information analyzing system 500A, since report generating output section 360 generates a moving information analysis report including a moving information analysis image generated before detecting a predetermined event (for example, a change in a layout of a sales area in a store) and a moving information analysis image generated after detecting the same event, it is possible to show how moving information regarding a staying position or a passing position of a moving object in an imaging region changes due to the predetermined event in a contrasted and easily understandable manner.

In moving information analyzing system 500A, a generated moving information analysis report is displayed on monitor 450 through a predetermined input operation (for example, a user's operation of pressing the report output button), and thus the moving information analysis report can be visually displayed to the user.

In moving information analyzing system 500A, since the respective cameras 100, 100A, . . . , and 100N perform generation of a background image of a captured image and extraction of moving information regarding a staying position or a passing position of a moving object included in the captured image, and then server 300 generates and displays a moving information analysis image, a processing load on server 300 can be reduced when compared with a case where server 300 performs generation of a background image of a captured image and extraction of moving information regarding a staying position or a passing position of a moving object included in the captured image, and thus it is possible to alleviate a limitation on the number of cameras which can be connected to a single server 300.

Modification Examples of Present Exemplary Embodiment

Figure 13:
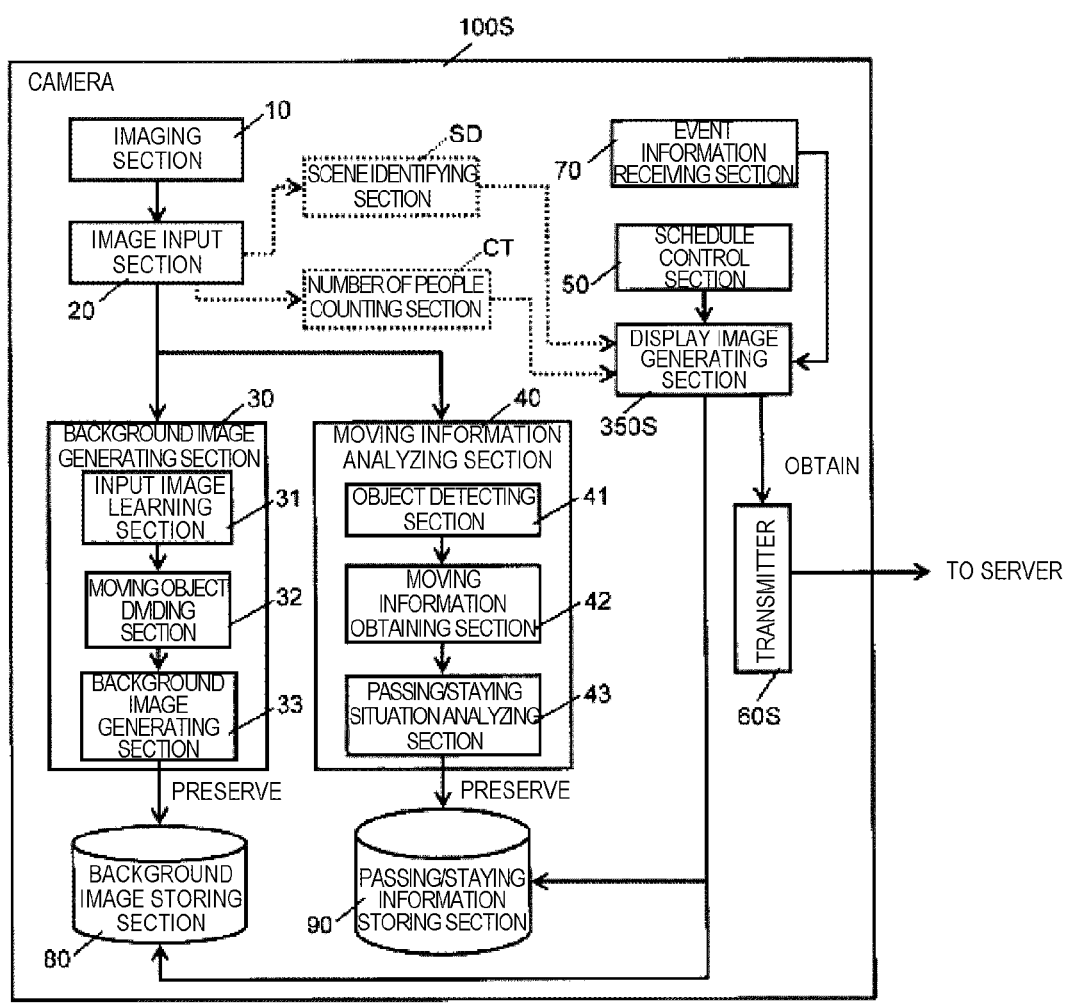
FIG. 13 is a block diagram illustrating details of a functional internal configuration of a camera of a modification example of the present exemplary embodiment.

In the above-described present exemplary embodiment, the process of generating a moving information analysis image is performed by server 300, but the process of generating a moving information analysis image may also be performed by camera 100 (refer to FIG. 13). FIG. 13 is a block diagram illustrating details of a functional internal configuration of a camera 100S of a modification example of the present exemplary embodiment. Camera 100S illustrated in FIG. 13 includes imaging section 10, image input section 20, background image generating section 30, moving information analyzing section 40, schedule control section 50, transmitter 60S, event information receiving section 70, background image storing section 80, passing/staying information storing section 90, and display image generating section 350S. In description of each section of camera 100S illustrated in FIG. 13, constituent elements having the same configuration and operation as those of camera 100 illustrated in FIG. 2 are given the same reference numerals, and description thereof will be omitted and differing content will be described.

Display image generating section 350S as an example of an image generating section generates a moving information analysis image in which moving information regarding a staying position and a passing position of a moving object is superimposed on a background image by using background image data preserved in background image storing section 80 and extraction result data of the moving information regarding the staying information or the passing information of the moving object preserved in passing/staying information storing section 90 in response to an instruction from schedule control section 50 or event information receiving section 70, and outputs the moving information analysis image to transmitter 60.

Transmitter 60S transmits data related to the moving information analysis image generated by display image generating section 350S to server 300.

As described above, in the modification example of the present exemplary embodiment, camera 100S generates a background image of a captured image of a predetermined imaging region, extracts moving information regarding a staying position or a passing position in the imaging region of a moving object (for example, a person) included in the captured image, and generates a moving information analysis image in which the moving information of the moving object is superimposed on the background image of the captured image by using the background image of the captured image and the moving information of the moving object.

Consequently, camera 100S generates the background image which is a base of the moving information analysis image so that the moving object (for example, a person) is removed so as not to be shown therein, and can thus appropriately protect the privacy of the moving object (the person) shown in an imaging region. Since camera 100S superimposes the moving information regarding the staying position or the passing position in the imaging region of the moving object (the person) on a captured image which is obtained in real time, it is possible to generate a moving information analysis image which appropriately indicates the latest moving information regarding the staying position or the passing position in the imaging region of the moving object in a state in which the moving object is removed from the captured image.

Since camera 100S performs a process up to a point of generating a moving information analysis image and transmits moving information analysis image data which is a result of the process to server 300, for example, server 300 may not perform the process of generating a moving information analysis image in a state in which a processing load on server 300 is considerably high, and thus it is possible to minimize an increase in the processing load on server 300.

As mentioned above, although various exemplary embodiments have been described with reference to the drawings, needless to say, the present invention is not limited to the exemplary embodiments.

It is obvious that a person skilled in the art can conceive of various modifications or alterations within the scope of the invention disclosed in the claims, and it is understood that they naturally fall within the technical scope of the present invention.

The present invention is useful as a moving information analyzing system, a camera, and a moving information analyzing method capable of appropriately protecting the privacy of a person shown in an imaging region and generating an accurate moving information analysis image in which staying information or passing information of the person is superimposed on a background image which is updated at a predetermined timing.

What is claimed is:

1. A moving information analyzing system comprising:
   a camera; and
   a server that is connected to the camera,
   wherein the camera includes:
      an imaging section that, in operation, captures an image of a predetermined imaging region;
      a background image generating section that, in operation, repeatedly generates a background image of a captured image of the imaging region at predetermined timings by removing a moving object from the captured image;
      a moving information analyzing section that, in operation, extracts moving information, the moving information visually indicating a location at which a moving object stays or a location through which the moving object passes in the imaging region included in the captured image; and
      a transmitter that, in operation, transmits the background image generated by the background image generating section and the moving information extracted by the moving information analyzing section to the server at a predetermined transmission cycle, and
   wherein the server includes;
      an image generating section that, in operation, generates a moving information analysis image in which the moving information is superimposed on the background image of the captured image, the moving information analysis image including a heat map; and
      a display control section that, in operation, displays the moving information analysis image generated by the image generating section on a display unit.

2. The moving information analyzing system of claim 1, wherein the camera further includes:
   a schedule control section that, in operation, gives, to the transmitter, an instruction for the predetermined transmission cycle for transmitting the background image and the moving information.

3. The moving information analyzing system of claim 2, wherein the camera further includes:
   an event information obtaining section that, in operation, obtains a notification of detection of a predetermined event, and
   wherein the event information obtaining section, in operation,
   gives an instruction for a transmission timing of the background image and the moving information to the transmitter after obtaining the notification of detection of the predetermined event.

4. The moving information analyzing system of claim 3, wherein the transmitter, in operation,
   does not transmit the background image and the moving information at the predetermined transmission cycle including a time point at which the event information obtaining section obtains a notification of change of the layout.

5. The moving information analyzing system of claim 3, wherein the server further includes:
   a report generating section that, in operation, generates a moving information analysis report including the moving information analysis image generated by the image generating section before the predetermined event is detected and the moving information analysis image generated by the image generating section after the predetermined event is detected.

6. The moving information analyzing system of claim 5, wherein the report generating section, in operation,
   displays the moving information analysis report on the display section in response to a predetermined input operation.

7. The moving information analyzing system of claim 1, wherein the camera further includes:
   an image change detecting section that, in operation, detects a change in the captured image,
   wherein the image change detecting section, in operation,
   gives an instruction for a transmission timing of the background image and the moving information to the transmitter after detecting the change in the captured image.

8. The moving information analyzing system of claim 1, wherein the camera further includes:
   a moving object detecting section that, in operation, counts the number of moving objects which are detected and included in the captured image, and
   wherein the moving object detecting section, in operation,
   outputs information regarding the number of moving objects which are detected and included in the captured image to the transmitter.

9. A camera which is connected to a server and is used in a moving information analyzing system, comprising:
   an imaging section that, in operation, captures an image of a predetermined imaging region;
   a background image generating section that, in operation, repeatedly generates a background image of a captured image of the imaging region at predetermined timings by removing a moving object from the captured image;

a moving information analyzing section that, in operation, extracts moving information, the moving information visually indicating a location at which a moving object stays or a location through which the moving object passes in the imaging region included in the captured image;

an image generating section that, in operation, generates a moving information analysis image in which the moving information is superimposed on the background image of the captured image at a predetermined transmission cycle by using the background image generated by the background image generating section and the moving information extracted by the moving information analyzing section, the moving information analysis image including a heat map; and a transmitter that, in operation, transmits the moving information analysis image generated by the image generating section to the server which displays the moving information analysis image, at the predetermined transmission cycle.

10. A moving information analyzing method for a moving information analyzing system in which a camera and a server are connected to each other, the method comprising:

causing the camera to perform:
   capturing an image of a predetermined imaging region;
   repeatedly generating a background image of a captured image of the imaging region at predetermined timings by removing a moving object from the captured image;
   extracting moving information, the moving information visually indicating a location at which a moving object stays or a location through which the moving object passes in the imaging region included in the captured image; and
   transmitting the generated background image generated and the extracted moving information to the server at a predetermined transmission cycle, and causing the server to perform:
   generating a moving information analysis image in which the moving information is superimposed on the background image of the captured image, the moving information analysis image including a heat map; and
   displaying the generated moving information analysis image on a display unit.

\* \* \* \* \*